(12) United States Patent
Tat et al.

(10) Patent No.: US 10,677,715 B2
(45) Date of Patent: Jun. 9, 2020

(54) THERMOGRAPHY INSPECTION FOR NEAR-SURFACE INCONSISTENCIES OF COMPOSITE STRUCTURES

(71) Applicant: The Boeing Company, Chicago, IL (US)

(72) Inventors: Hong Hue Tat, Redmond, WA (US); William Joseph Tapia, Kapowsin, WA (US); Barry Allen Fetzer, Renton, WA (US); Gary E. Georgeson, Tacoma, WA (US); Martin L. Freet, Federal Way, WA (US); Jeffrey G. Thompson, Auburn, WA (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 15/821,668

(22) Filed: Nov. 22, 2017

(65) Prior Publication Data
US 2019/0154565 A1    May 23, 2019

(51) Int. Cl.
*G01N 21/17* (2006.01)
*G01N 29/04* (2006.01)
*G01N 25/72* (2006.01)
*G01N 21/84* (2006.01)

(52) U.S. Cl.
CPC ......... *G01N 21/1702* (2013.01); *G01N 25/72* (2013.01); *G01N 29/041* (2013.01); *G01N 2021/1706* (2013.01); *G01N 2021/8472* (2013.01); *G01N 2291/0231* (2013.01); *G01N 2291/101* (2013.01)

(58) Field of Classification Search
CPC ...... G01N 29/04; G01N 29/041; G01N 25/72; G01N 21/88
See application file for complete search history.

(56) References Cited

U.S. PATENT DOCUMENTS

| | | | |
|---|---|---|---|
| 6,394,646 B1 * | 5/2002 | Ringermacher | G01B 11/06 374/7 |
| 7,075,084 B2 | 7/2006 | Thompson et al. | |
| 7,287,902 B2 | 10/2007 | Safai et al. | |
| 7,605,924 B2 * | 10/2009 | Howard | G01N 25/72 356/432 |
| 9,495,737 B2 | 11/2016 | Holmes et al. | |
| 9,645,012 B2 | 5/2017 | Marsh et al. | |

(Continued)

FOREIGN PATENT DOCUMENTS

| | | |
|---|---|---|
| JP | 2006170684 A | 6/2006 |
| JP | 2015010944 A | 1/2015 |

OTHER PUBLICATIONS

European Patent Office Communication and Extended Search Report, dated Apr. 2, 2019, regarding Application No. 18194689.8, 48 pages.

*Primary Examiner* — Yara B Green
(74) *Attorney, Agent, or Firm* — Yee & Associates, P.C.

(57) ABSTRACT

Methods are presented. Signals are sent into a first surface of a structure using an ultrasonic transducer. Ultrasound response signals are received at the ultrasonic transducer. A portion of a second surface of the structure is heated while the ultrasonic transducer is sending signals into the first surface, wherein the second surface is on an opposite side of the structure from the first surface. Infrared images of the portion of the second surface of the structure are taken after heating the second surface.

19 Claims, 8 Drawing Sheets

(56) References Cited

U.S. PATENT DOCUMENTS

| | | | |
|---|---|---|---|
| 2005/0023468 A1* | 2/2005 | Saito | G01N 25/72 |
| | | | 250/341.6 |
| 2008/0137105 A1 | 6/2008 | Howard et al. | |
| 2010/0019153 A1* | 1/2010 | Zalameda | G01N 25/72 |
| | | | 250/339.02 |
| 2014/0118530 A1* | 5/2014 | Holmes | G01N 25/72 |
| | | | 348/92 |
| 2015/0260667 A1* | 9/2015 | Isakov | G01N 25/72 |
| | | | 374/5 |
| 2016/0018324 A1* | 1/2016 | Georgeson | G01N 21/171 |
| | | | 250/341.6 |
| 2017/0212066 A1* | 7/2017 | Thompson | G01N 25/72 |
| 2017/0374296 A1* | 12/2017 | Schmidt | G01J 5/025 |

* cited by examiner

THERMOGRAPHY INSPECTION FOR NEAR-SURFACE INCONSISTENCIES OF COMPOSITE STRUCTURES

BACKGROUND INFORMATION

1. Field

The present disclosure relates generally to inspection of composite structures and, more specifically, to inspection of composite structures using thermographic inspection techniques. Yet more specifically, the present disclosure relates to thermographic inspection of composite surfaces, including non-parallel or rough surfaces, for near-surface inconsistencies.

2. Background

Ultrasound is a non-destructive inspection method used in the inspection of structures, including composite structures. Ultrasonic inspections send ultrasonic signals into a structure and analyze ultrasound response signals to inspect the structure.

Ultrasonic inspection is sensitive to structural geometry. To inspect a structure using ultrasound, it is desirable for the front surface and back surface of the structure to be parallel to each other. For ultrasonic inspection, it is desirable for the front surface and the back surface to be substantially smooth.

Composite structures having non-parallel surfaces, high surface roughness, or near-surface inconsistencies may be challenging to inspect with traditional ultrasonic inspection techniques, impacting the time and/or effort required to complete an inspection. Therefore, it would be desirable to have a method and apparatus that take into account at least some of the issues discussed above, as well as other possible issues.

SUMMARY

An illustrative embodiment of the present disclosure provides a method. Signals are sent into a first surface of a structure using an ultrasonic transducer. Ultrasound response signals are received at the ultrasonic transducer. A portion of a second surface of the structure is heated while the ultrasonic transducer is sending signals into the first surface, wherein the second surface is on an opposite side of the structure from the first surface. Infrared images of the portion of the second surface of the structure are taken after heating the second surface.

Another illustrative embodiment of the present disclosure provides a method. A thermography system is positioned at a first position relative to a second surface of a structure, wherein the second surface comprises a plurality of sections in which each section of the plurality of sections has a different angle. A portion of the second surface of the structure is heated with a heat source of the thermography system to form a heated portion. Infrared images of the heated portion are taken, wherein each section of the second surface within the heated portion has at least one infrared camera of the thermography system positioned within +/−30 degrees from the section. The thermography system is moved to a second position relative to the second surface after taking the infrared images of the heated portion.

A further illustrative embodiment of the present disclosure provides a method. Ultrasonic inspection is performed on a first surface of a composite structure. Thermographic inspection is performed on a second surface of the composite structure, wherein the second surface is on an opposite side of the composite structure from the first surface, and wherein at least a fraction of the second surface is not parallel to the first surface. Near-surface inconsistencies are identified for the second surface of the structure using the thermographic inspection.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
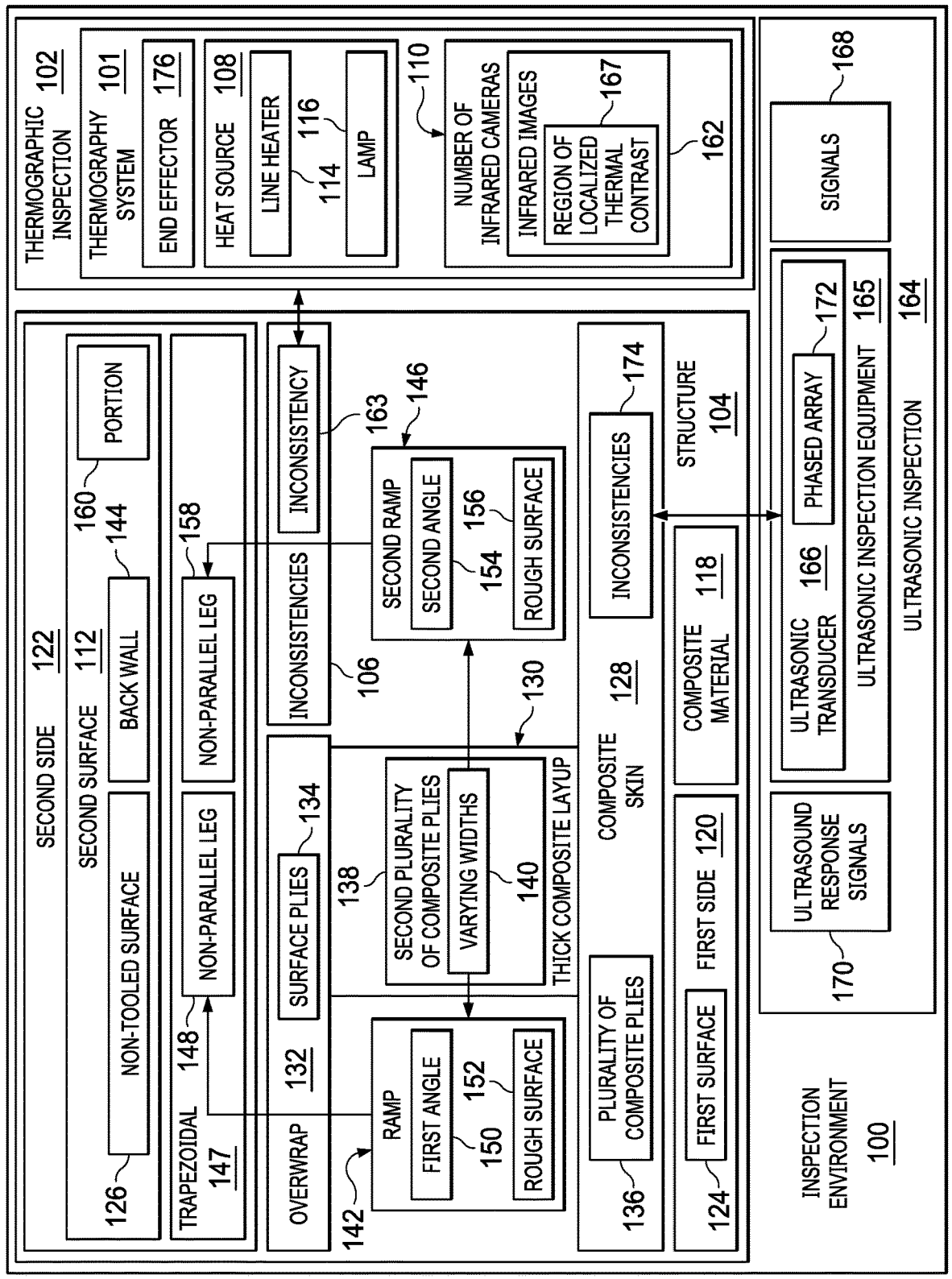
FIG. 1 is an illustration of a block diagram of an environment in which a composite structure is inspected using ultrasonic techniques in accordance with an illustrative embodiment.

The illustrative embodiments recognize and take into account one or more different considerations. For example, the illustrative embodiments recognize and take into account that detecting inconsistencies, such as delamination and foreign material near either the front or back surface of structures, may be undesirably difficult using ultrasonic inspection. The illustrative embodiments recognize and take into account that inconsistencies near either the front or back surface of a structure can be undesirably difficult to detect ultrasonically due to interference with the surface echoes. The illustrative embodiments recognize and take into account that inconsistencies near either the front or back surface of a structure can be undesirably difficult to detect because ultrasound is sensitive to local geometry.

The illustrative embodiments recognize and take into account that inspection requirements near a surface may be modified when ultrasound inspection is undesirably difficult there. The illustrative embodiments recognize and take into account that modified inspection requirements due to inconsistency sensitivity capabilities may impact design of the structure. The illustrative embodiments recognize and take into account that increasing inconsistency detection near surfaces can enable improved design of structures.

The illustrative embodiments recognize and take into account that in a co-cured or co-bonded composite structure, an interface connects the parts of the composite structure. The illustrative embodiments recognize and take into account that if an inconsistency occurs at an interface, it may be undesirably difficult to identify a size of the inconsistency using solely ultrasound. The illustrative embodiments recognize and take into account that an inconsistency within an interface may be identified and measured using a combination of inspection techniques.

The illustrative embodiments recognize and take into account that infrared thermography is capable of performing near-surface flaw detection. The illustrative embodiments recognize and take into account that thermography may be used to inspect to a depth of about ¼ inch. The illustrative embodiments recognize and take into account that detection of inconsistencies with thermography is more successful nearer the surface than deeper in the structure.

The illustrative embodiments recognize and take into account that infrared thermography has a larger field of view than ultrasonic inspection. The illustrative embodiments recognize and take into account that having a larger field of view causes infrared thermography to be faster than ultrasonic inspection.

The illustrative embodiments recognize and take into account that infrared thermography does not require coupling with water. The illustrative embodiments recognize and take into account that in ultrasonic inspection, water or other coupling materials are used to transmit and receive the ultrasonic signals from the surface of the structure. The illustrative embodiments recognize and take into account that a coupling system is included in ultrasonic inspection systems, increasing the complexity of the system. For example, water or other coupling materials for ultrasonic inspection are collected.

The illustrative embodiments recognize and take into account that ultrasonic inspection systems are contact inspection systems. The illustrative embodiments recognize and take into account that thermography inspection systems are standoff inspection systems. A standoff is a distance from a structure to be inspected. The illustrative embodiments recognize and take into account that infrared thermography is performed at specified standoff distances from the structure.

The illustrative embodiments recognize and take into account that ultrasound requires more precise positioning relative to the structure than infrared thermography. The illustrative embodiments recognize and take into account that by combining infrared thermography and ultrasound inspections, automated inspection may be performed on opposite sides of a structure at the same time. The illustrative embodiments recognize and take into account that ultrasound from opposite sides may affect the quality of signals received at both sides due to the signal reflections.

The illustrative embodiments recognize and take into account that overwrap plies may eliminate the need for IML (inner mold line) tooling. The illustrative embodiments recognize and take into account that inconsistencies in or under overwrap plies will lie between or in plies. The illustrative embodiments recognize and take into account that the inconsistencies in or under the overwrap may not be readily inspected using ultrasound. The illustrative embodiments recognize and take into account that an inconsistency in or under the overwrap may not be parallel to the majority of the plies over which the overwrap ply is wrapped. The illustrative embodiments recognize and take into account that non-parallel inconsistencies would scatter the sound in a direction away from the ultrasound transducer.

Referring now to the figures and, in particular, with reference to FIG. 1, an illustration of a block diagram of an environment in which a composite structure is inspected using ultrasonic techniques is depicted in accordance with an illustrative embodiment. Inspection environment 100 includes thermography system 101 to perform thermographic inspection 102 on structure 104. Thermographic inspection 102 detects inconsistencies 106 in structure 104.

Thermographic inspection 102 is performed using heat source 108 and number of infrared cameras 110. As used herein, a "number of" items is one or more items. Thus, "number of infrared cameras 110" includes one or more infrared cameras.

In some illustrative examples, heat source 108 and number of infrared cameras 110 move relative to structure 104 to perform thermographic inspection 102 on second surface 112 of structure 104. In some illustrative examples, structure 104 is moved relative to heat source 108 and infrared cameras 110 to perform thermographic inspection 102 on second surface 112 of structure 104.

In some illustrative examples, heat source 108 takes the form of line heater 114. In some illustrative examples, when heat source 108 takes the form of line heater 114, line heater 114 and number of infrared cameras 110 may be "scanned" or swept relative to second surface 112 of structure 104 to perform thermographic inspection 102.

In some illustrative examples, heat source 108 takes the form of lamp 116. In some illustrative examples, lamp 116 may be a heat lamp or a flash lamp. In some illustrative examples, when heat source 108 takes the form of lamp 116, lamp 116 and number of infrared cameras 110 may be stepped across second surface 112 of structure 104 to perform thermographic inspection 102.

In some illustrative examples, structure 104 is formed of composite material 118. In these illustrative examples, structure 104 is referred to as a composite structure. Thermographic inspection 102 detects inconsistencies 106 at a depth of within ¼ inch (or 0.635 cm) of second surface 112 of structure 104. Inconsistencies 106 within ¼ inch of second surface 112 are also referred to as near-surface inconsistencies.

Structure 104 has first side 120 and second side 122. First side 120 is opposite second side 122. Second surface 112 is on second side 122 of structure 104. First surface 124 is on first side 120 of structure 104.

In some illustrative examples, second side 122 has non-tooled surface 126. Non-tooled surface 126 is formed without hard tooling. Non-tooled surface 126 may have a different surface roughness than a surface formed with hard tooling.

When structure 104 is formed of composite material 118, composite material 118 may be laid up as composite plies. As depicted, structure 104 is formed from composite skin 128, thick composite layup 130, and overwrap 132. In some illustrative examples, overwrap 132 is optional.

Inconsistencies 106 may be present in any portion of structure 104 within ¼ inch of second surface 112. Inconsistencies 106 may be present in at least one of overwrap 132, thick composite layup 130, or composite skin 128. When overwrap 132 is optional, inconsistencies 106 may be present in at least one of thick composite layup 130 or composite skin 128.

First side 120 is formed by part of composite skin 128. When overwrap 132 is present, second side 122 is formed using overwrap 132. In these illustrative examples, overwrap 132 covers thick composite layup 130. In some illustrative examples, thick composite layup 130 may also be referred to as a stack composite layup. In some illustrative examples, thick composite layup 130 may be measured on the order of inches. For example, thick composite layup 130 may be one inch, two inches, three inches, or even more. When overwrap 132 covers thick composite layup 130, overwrap 132 forms second side 122.

In other illustrative examples, overwrap 132 is not present. When overwrap 132 is not present, thick composite layup 130 forms second side 122.

Composite skin 128 is formed by laying up plurality of composite plies 136. Plurality of composite plies 136 and second plurality of composite plies 138 of thick composite layup 130 are parallel to each other. Second plurality of composite plies 138, having varying widths 140, is laid up to form thick composite layup 130. In some illustrative examples, composite skin 128 and thick composite layup 130 are co-cured to form structure 104. In some illustrative examples, composite skin 128 and thick composite layup 130 are co-bonded to form structure 104.

In some illustrative examples, curing thick composite layup 130 forms ramp 142. As depicted, second plurality of composite plies 138, having varying widths 140, make up ramp 142 and second ramp 146. When second surface 112 is trapezoidal 147, ramp 142 forms non-parallel leg 148 of second surface 112. In some illustrative examples, non-parallel leg 148 is formed of thick composite layup 130. In some illustrative examples, non-parallel leg 148 of second surface 112 has the shape of ramp 142 but is formed of overwrap 132.

Ramp 142 has first angle 150 relative to first side 120. When ramp 142 is part of second side 122 and second side 122 is non-tooled surface 126, ramp 142 has rough surface 152. When ramp 142 has rough surface 152, ramp 142 has significant variation in average surface roughness.

As depicted, structure 104 also has second ramp 146. Second ramp 146 is formed using second plurality of composite plies 138. Second ramp 146 has second angle 154 relative to first side 120. When second ramp 146 is part of second side 122 and second side 122 is non-tooled surface 126, second ramp 146 has rough surface 156. When second ramp 146 has rough surface 156, second ramp 146 has significant variation in average surface roughness.

In some illustrative examples, second ramp 146 is part of trapezoidal 147 second surface 112. When second ramp 146 forms part of trapezoidal 147 second surface 112, second ramp 146 forms non-parallel leg 158 of second surface 112.

During thermographic inspection 102, heat source 108 heats portion 160 of second surface 112 of structure 104. In some illustrative examples, heating portion 160 of second surface 112 comprises heating portion 160 with line heater 114. In some illustrative examples, heating portion 160 of second surface 112 comprises heating portion 160 with a heat lamp or a flash lamp.

In some illustrative examples, when heat source 108 is line heater 114, structure 104 is scanned using thermography system 101. In some illustrative examples, thermography system 101 includes lamp 116 and number of infrared cameras 110 connected to an end effector (not depicted). In these illustrative examples, thermography system 101 moves relative to structure 104 to scan structure 104. In other illustrative examples, structure 104 moves relative to thermography system 101 to scan structure 104. In some illustrative examples, infrared images 162 are taken continuously during thermographic inspection 102.

In other illustrative examples, thermography system 101 performs a pulsed inspection. When thermographic inspection 102 is pulsed, at least one of structure 104 or thermography system 101 is moved relative to each other in a step-wise method.

In a pulsed method, heat source 108 heats portion 160 and then number of infrared cameras 110 takes infrared images 162 of portion 160. In some illustrative examples, thermography system 101 is moved relative to structure 104 after taking infrared images 162.

Inconsistencies 106 are identified from infrared images 162. Inconsistencies 106 are detected using regions of localized thermal contrast identified in infrared images 162. Inconsistencies 106 may also be referred to as near-surface inconsistencies. Thermographic inspection 102 detects inconsistencies 106 within ¼ inch of second surface 112 of structure 104.

In one illustrative example, region of localized thermal contrast 167 is identified in infrared images 162. In this illustrative example, inconsistency 163 within ¼ inch of second surface 112 of structure 104 is detected using region of localized thermal contrast 167.

Some of inconsistencies 106 may be non-parallel to first surface 124. In one illustrative example, inconsistency 163 is present in one of non-parallel leg 148 or non-parallel leg 158. In this illustrative example, thermography system 101 detects inconsistency 163 in a non-parallel leg, non-parallel leg 148 or non-parallel leg 158, of the second surface 112. Some of inconsistencies 106 may be non-parallel to plurality of composite plies 136 and second plurality of composite plies 138.

Inconsistencies 106 are detected using thermography system 101 even when second surface 112 is non-tooled surface 126. Inconsistencies 106 are detected using thermography system 101 even when ramp 142 has rough surface 152 and second ramp 146 has rough surface 156.

In some illustrative examples, first surface 124 and second surface 112 may be inspected simultaneously. In some illustrative examples, ultrasonic inspection 164 is performed on first surface 124 while thermographic inspection 102 is performed on second surface 112. Ultrasonic inspection equipment 165 performs ultrasonic inspection 164 on first surface 124. In some illustrative examples, ultrasonic inspection equipment 165 takes the form of ultrasonic transducer 166.

Ultrasonic transducer 166 sends signals 168 into first surface 124 of structure 104. Ultrasound response signals 170 are formed at second surface 112 of structure 104. Ultrasonic transducer 166 receives ultrasound response signals 170. In some illustrative examples, ultrasonic transducer 166 takes the form of phased array 172.

Inconsistencies 174 near first surface 124 are detected using ultrasound response signals 170. Inconsistencies 174 are in plurality of composite plies 136 or second plurality of composite plies 138.

The illustration of inspection environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, thermography system 101 may optionally include end effector 176. In some illustrative examples, an infrared camera of number of infrared cameras 110 and lamp 116 taking the form of a heat lamp or a flash lamp are connected to end effector 176. In these illustrative examples, end effector 176 is moved relative to structure 104 after taking infrared images 162 of portion 160 of second surface 112 of structure 104.

Figure 2:
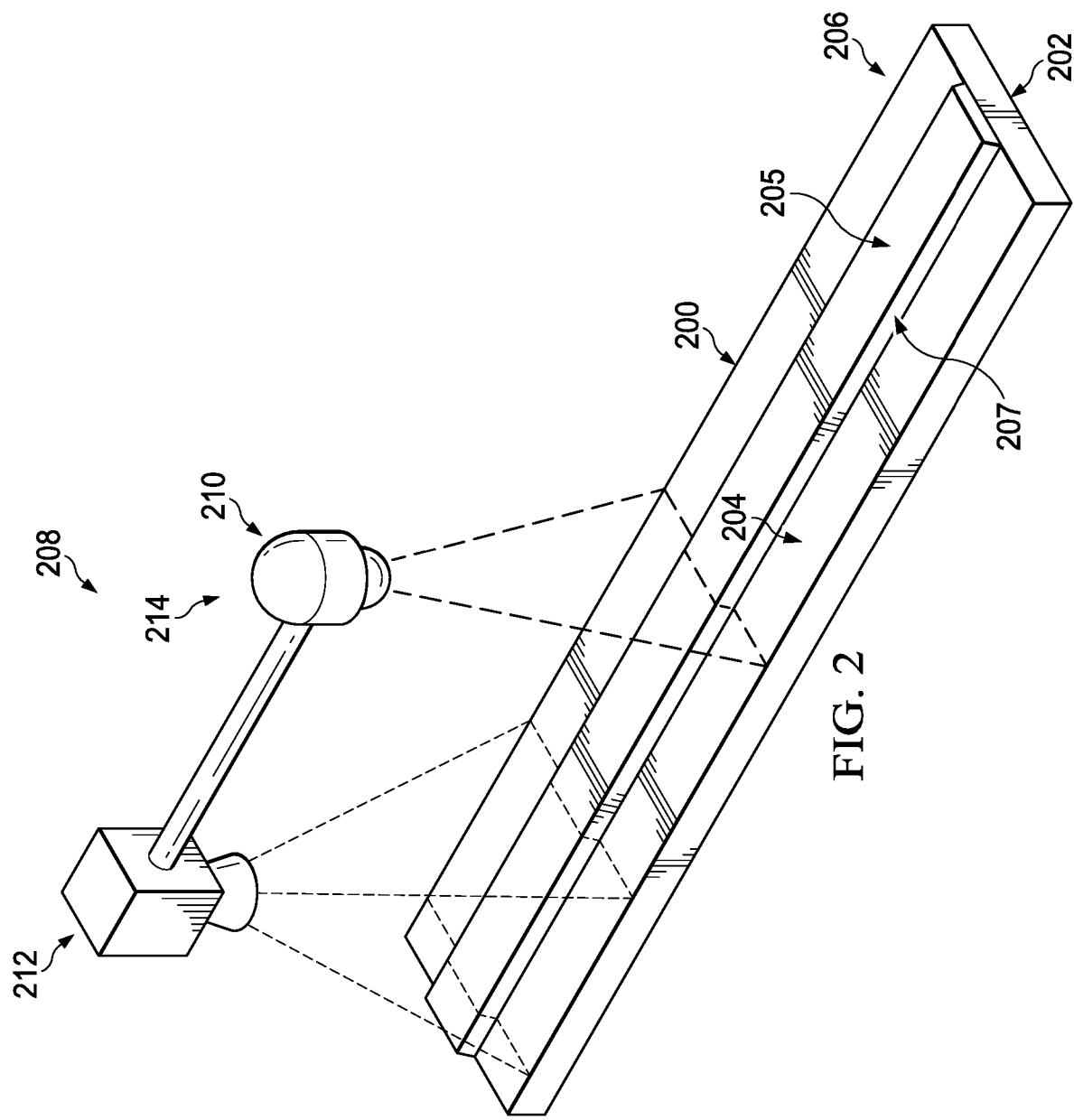
FIG. 2 is an illustration of an isometric view of inspecting a composite structure using a thermography system in accordance with an illustrative embodiment.

Turning now to FIG. 2, an illustration of an isometric view of inspecting a composite structure using a thermography system is depicted in accordance with an illustrative embodiment. Structure 200 is a physical implementation of structure 104 of FIG. 1. Structure 200 has first surface 202 and second surface 204.

Second surface 204 has a plurality of angles. Second surface 204 has plurality of sections 206. Each section of plurality of sections 206 has its own angle. As depicted, second surface 204 has trapezoidal portion 205. Trapezoidal portion 205 of second surface 204 has non-parallel leg 207 formed by a ramp of structure 200. Non-parallel leg 207 is non-parallel to first surface 202 of structure 200.

Thermography system 208 is one physical implementation of thermography system 101 of FIG. 1. Thermography system 208 performs a thermographic inspection, such as thermographic inspection 102 of FIG. 1. Thermography system 208 comprises heat source 210 and infrared camera 212. Although thermography system 208 is depicted as having a single infrared camera, infrared camera 212, thermography system 208 includes any desirable quantity of cameras. Thermography system 208 includes any desirable quantity of cameras to image second surface 204. Thermography system 208 has at least one infrared camera positioned within +/−30 degrees from each section of second surface 204.

As the angles of plurality of sections 206 change, the desirable quantity of infrared cameras may also change. In some illustrative examples, plurality of sections 206 may all have angles within 30 degrees of each other section of plurality of sections 206. In these illustrative examples, thermography system 208 may only have a single camera. In some illustrative examples, plurality of sections 206 may have angles greater than 30 degrees relative to each other. In these illustrative examples, thermography system 208 has two or more cameras. In some illustrative examples, each infrared camera of thermography system 208 is positioned at a different orientation relative to each other infrared camera of thermography system 208.

As depicted, heat source 210 takes the form of line heater 214. Thermography system 208 is used in a line scan or dynamic thermographic inspection. In some illustrative examples, structure 200 may move relative to thermography system 208 to inspect second surface 204. In other illustrative examples, thermography system 208 moves relative to structure 200 to inspect second surface 204.

Line heater 214 heats a portion of second surface 204 of structure 200 to form a heated portion. Afterwards, infrared camera 212 takes infrared images of the heated portion. In this illustrative example, moving thermography system 208 across structure 200 in a continuous fashion occurs as line heater 214 is heating structure 200 and as infrared camera 212 is taking infrared images of structure 200.

The illustrations of structure 200 and thermography system 208 in FIG. 2 are not meant to imply physical or architectural limitations to the manner in which an illustrative embodiment may be implemented. For example, a distance between line heater 214 and infrared camera 212 may have any desirable value. Additionally, a distance between thermography system 208 and structure 200 may have any desirable value. Further, structure 200 may take any desirable form, with other shapes or sizes.

Figure 3:
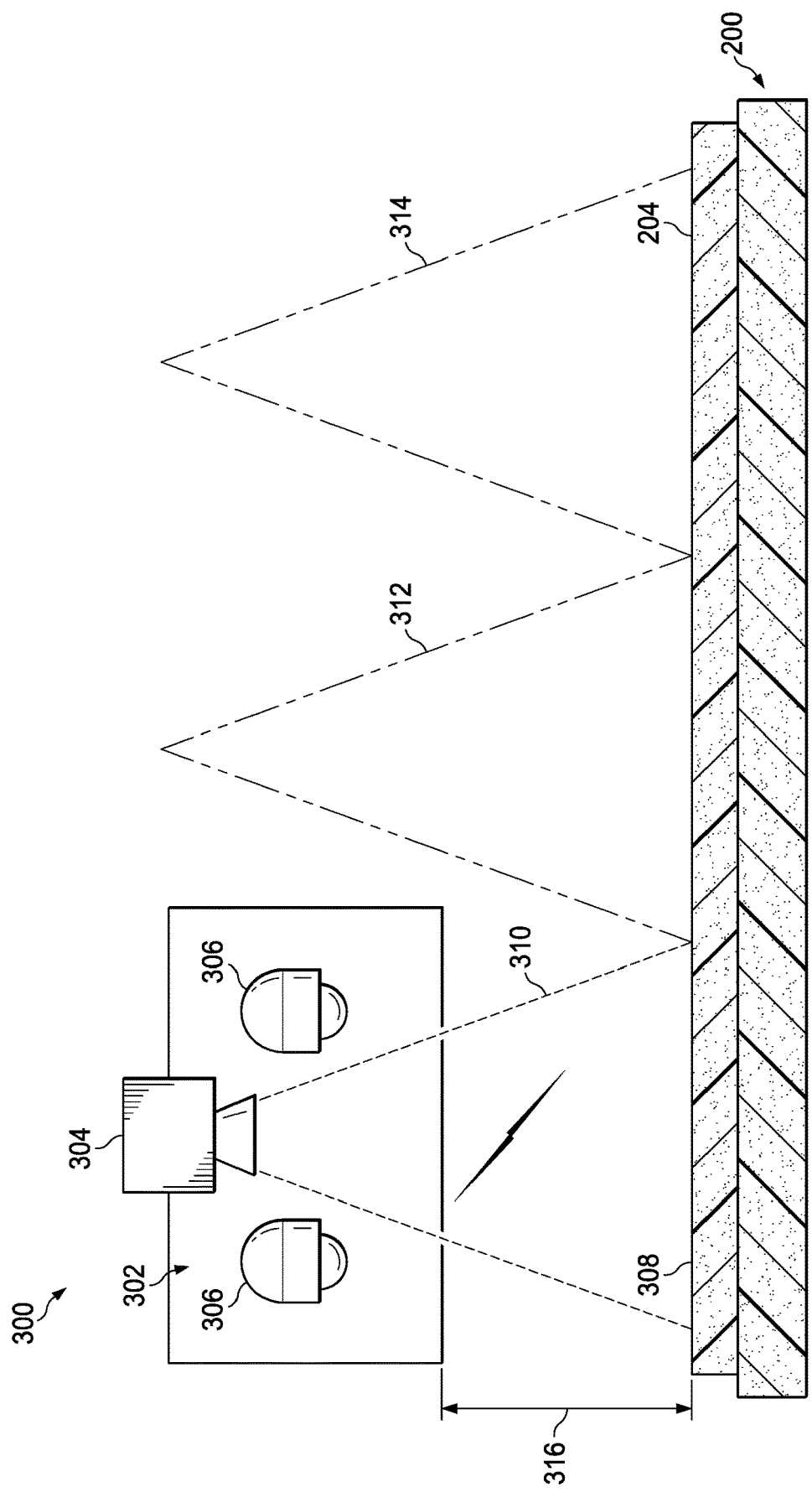
FIG. 3 is an illustration of a cross-sectional view of inspecting a composite structure using a thermography system in accordance with an illustrative embodiment.

Turning now to FIG. 3, an illustration of a cross-sectional view of inspecting a composite structure using a thermography system is depicted in accordance with an illustrative embodiment. Thermography system 300 is a physical implementation of thermography system 101 of FIG. 1. Thermography system 300 is an alternative arrangement for performing thermographic inspection on structure 200. Thermography system 300 is used in a pulsed inspection. Thermography system 300 has heat source 302 and infrared camera 304. Heat source 302 takes the form of lamps 306. Lamps 306 may be selected from heat lamps or flash lamps.

To perform thermographic inspection using thermography system 300, lamps 306 heat portion 308 of second surface 204 to form a heated portion. After heating portion 308, infrared camera 304 takes images of portion 308 of second surface 204. Afterwards, thermography system 300 moves relative to structure 200 in a stepwise fashion. Thus, thermography system 300 moves across structure 200 in a discontinuous fashion.

As depicted, thermography system 300 may move relative to structure 200 to inspect second surface 204 in first field of view 310 followed by second field of view 312, and then third field of view 314. The size of the field of view for thermography system 300 is dependent upon distance 316 that thermography system 300 is from second surface 204 and specifications for infrared camera 304.

The illustrations of structure 200 and thermography system 300 in FIG. 3 are not meant to imply physical or architectural limitations to the manner in which an illustrative embodiment may be implemented. For simplicity only, thermography system 300 is depicted as having a single camera, infrared camera 304. In other illustrative examples, thermography system 300 may have any desirable quantity of infrared cameras. In other illustrative examples, thermography system 300 may have any desirable quantity of lamps.

Figure 4:
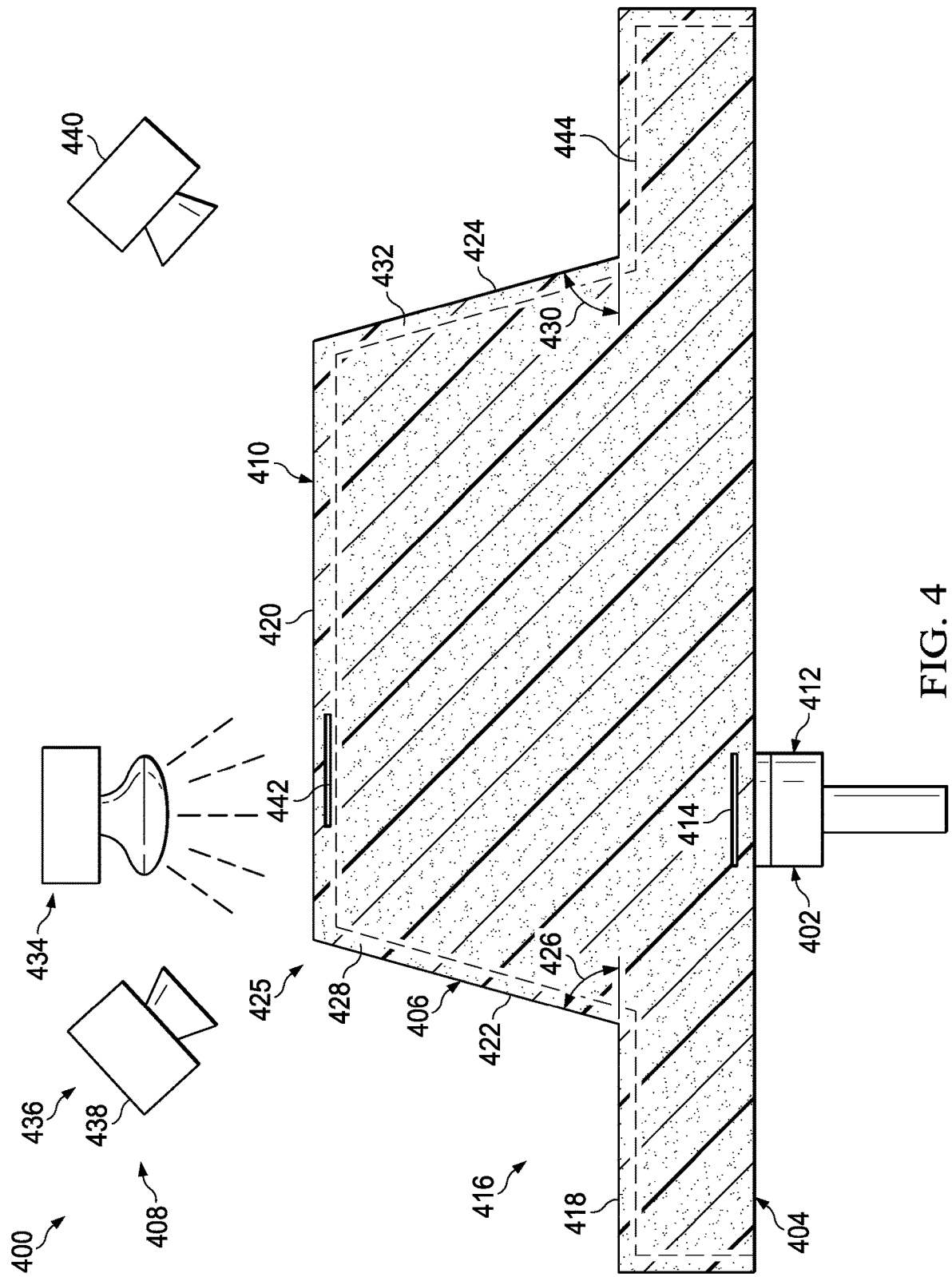
FIG. 4 is an illustration of a cross-sectional view of a simultaneous ultrasonic inspection and infrared inspection of a composite structure in accordance with an illustrative embodiment.

Turning now to FIG. 4, an illustration of a cross-sectional view of a simultaneous ultrasonic inspection and infrared inspection of a composite structure is depicted in accordance with an illustrative embodiment. Inspection environment 400 has ultrasonic inspection system 402 inspecting first surface 404 of structure 406 and thermography system 408 inspecting second surface 410 of structure 406. Inspection environment 400 is a physical implementation of inspection environment 100 of FIG. 1. Structure 406 is a physical implementation of structure 104 of FIG. 1.

As depicted, ultrasonic inspection system 402 has ultrasonic transducer 412. Ultrasonic transducer 412 sends signals into first surface 404 of structure 406 and receives ultrasound response signals. Ultrasonic inspection system 402 detects inconsistencies near first surface 404, such as inconsistency 414 using the ultrasound response signals.

As depicted, first surface 404 is substantially planar. First surface 404 is also substantially smooth to facilitate ultrasonic inspection using ultrasonic inspection system 402.

Second surface 410 of structure 406 has a plurality of angles. Second surface 410 has plurality of sections 416. As depicted, each section of plurality of sections 416 has an angle independent of each other section of plurality of sections 416. As depicted, section 418 and section 420 are parallel to first surface 404. As depicted, section 422 and section 424 are not parallel to first surface 404.

As depicted, section 422, section 420, and section 424 are trapezoidal 425. Angle 426 of section 422 is formed by ramp 428 of structure 406. Section 422 may be referred to as a non-parallel leg of trapezoidal 425 portion of second surface 410. Angle 430 of section 424 is formed by second ramp 432 of structure 406. Section 424 may be referred to as a non-parallel leg of trapezoidal 425 portion of second surface 410.

Ultrasonic inspection of second surface 410 may be more difficult than desirable due to at least one of plurality of sections 416, direction of plies forming second surface 410, or roughness of second surface 410. Detection of inconsistencies near second surface 410 using ultrasonic inspection may be more difficult than desired due to at least one of depth of inconsistencies or presence of an overwrap. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Thermography system 408 performs thermographic inspection on second surface 410. In some illustrative examples, inspection of first surface 404 and inspection of second surface 410 may be performed simultaneously as depicted. In other illustrative examples, inspection of first surface 404 and inspection of second surface 410 can be in sequence.

As depicted, thermography system 408 includes lamp 434 and number of infrared cameras 436. Number of infrared cameras 436 includes infrared camera 438 and infrared camera 440. As depicted, infrared camera 438 and infrared camera 440 are positioned at different orientations relative to each other.

Thermography system 408 inspects second surface 410 to detect inconsistency 442. Inconsistency 442 is within ¼ inch from second surface 410.

As depicted, dashed line 444 denotes a region of structure 406 formed by an overwrap, such as overwrap 132 of FIG. 1. The plies in the region from dashed line 444 to second surface 410 are not planar. Each ply in the region from dashed line 444 to second surface has the same shape as second surface 410. In some illustrative examples, inconsistencies may be introduced by overwrap that are parallel to at least one of section 422 or section 424.

In this depicted example, structure 406 may be formed from a thick composite layup, composite skin, and the overwrap. The plies of the thick composite layup and composite skin are substantially planar. The plies of the thick composite layup and composite skin are substantially parallel to first surface 404.

In some other non-depicted illustrative examples, an overwrap may not be used to form structure 206. In these illustrative examples, all plies of structure 206 are substantially planar. In these illustrative examples, all plies of structure 206 are substantially parallel to first surface 404.

Figure 5:
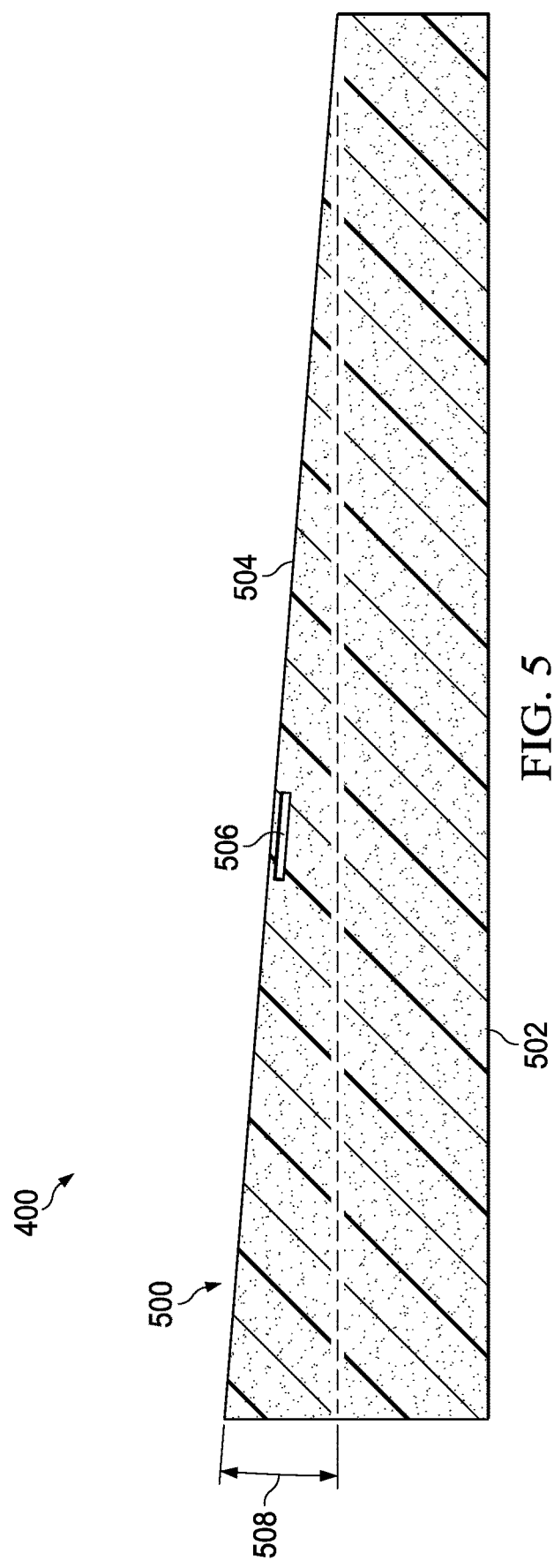
FIG. 5 is an illustration of a cross-sectional view of a composite structure with an inconsistency parallel to an angled surface in accordance with an illustrative embodiment.

Turning now to FIG. 5, an illustration of a cross-sectional view of a composite structure with an inconsistency parallel to an angled surface is depicted in accordance with an illustrative embodiment. Structure 500 is a physical implementation of structure 104 of FIG. 1. Structure 500 has first surface 502 and second surface 504. As depicted, second surface 504 is not parallel to first surface 502. Further, inconsistency 506 near second surface 504 is not parallel to first surface 502.

Inconsistency 506 is detected using thermographic inspection, such as thermographic inspection 102 of FIG. 1. Using thermographic inspection, the angle of inconsistency 506 relative to first surface 502 does not affect detection of inconsistency 506.

Second surface 504 is inspected using a thermography system having any desirable components. In some illustrative examples, inconsistency 506 is detected using thermography system 208 of FIG. 2 or thermography system 300 of FIG. 3. As depicted, second surface 504 has one angle, angle 508 relative to first surface 502. In some illustrative examples, as second surface 504 has only one angle, one infrared camera may be used in a thermography system. In other illustrative examples, a thermography system used to inspect second surface 504 includes more than one infrared camera.

In some illustrative examples, second surface 504 is inspected using a thermography system as first surface 502 is inspected using ultrasonic inspection equipment. In some illustrative examples, second surface 504 is inspected using a thermography system during a movement or transferring step for structure 500.

Figure 6:
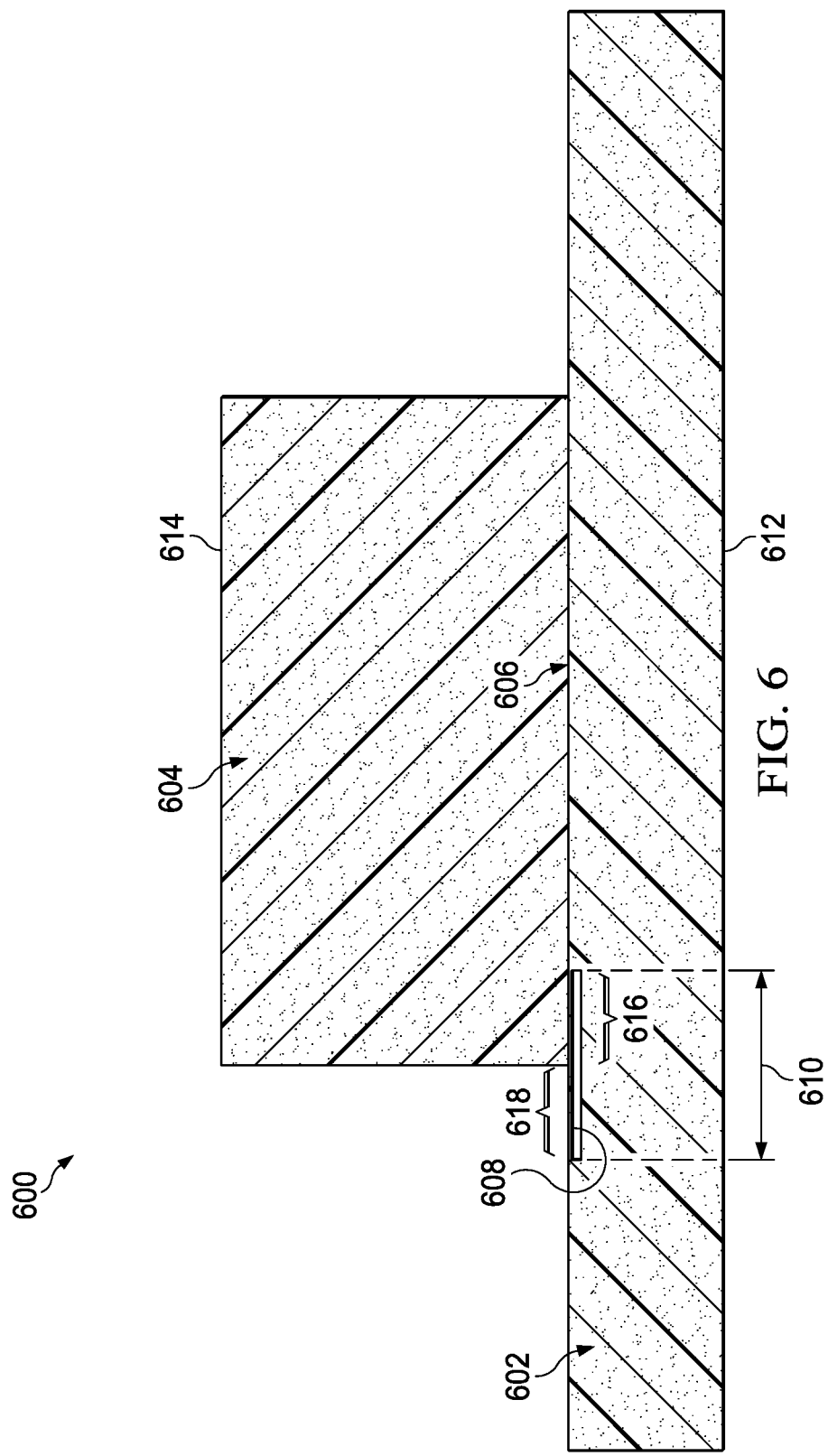
FIG. 6 is an illustration of a cross-sectional view of an inconsistency positioned in an interface of a composite structure in accordance with an illustrative embodiment.

Turning now to FIG. 6, an illustration of a cross-sectional view of an inconsistency positioned in an interface of a composite structure is depicted in accordance with an illustrative embodiment. Structure 600 is a physical implementation of structure 104 of FIG. 1. Structure 600 has composite skin 602 and thick composite layup 604 joined at interface 606. Composite skin 602 and thick composite layup 604 may form interface 606 by co-curing or by co-bonding. When interface 606 is formed by co-curing, interface 606 may be referred to as a co-cured composite interface. When interface 606 is formed by co-bonding, interface 606 may be referred to as a co-bonded composite interface.

As depicted, inconsistency 608 extends into interface 606. Inconsistency 608 may be detected by two different types of inspection. In some illustrative examples, size 610 of inconsistency 608 is measured using ultrasound response signals and infrared images. In these illustrative examples, ultrasonic inspection is performed on first surface 612 of structure 600. In these illustrative examples, thermographic inspection is performed on second surface 614 of structure 600.

Ultrasound response signals from the ultrasonic inspection are used to identify portion 616 of inconsistency 608. Infrared images from the thermographic inspection are used to identify portion 618 of inconsistency 608. By combining portion 616 and portion 618, size 610 of inconsistency 608 is determined.

The different components shown in FIGS. 2-6 may be combined with components in FIG. 1, used with components in FIG. 1, or a combination of the two. Additionally, some of the components in FIGS. 2-6 may be illustrative examples of how components shown in block form in FIG. 1 can be implemented as physical structures.

Figure 7:
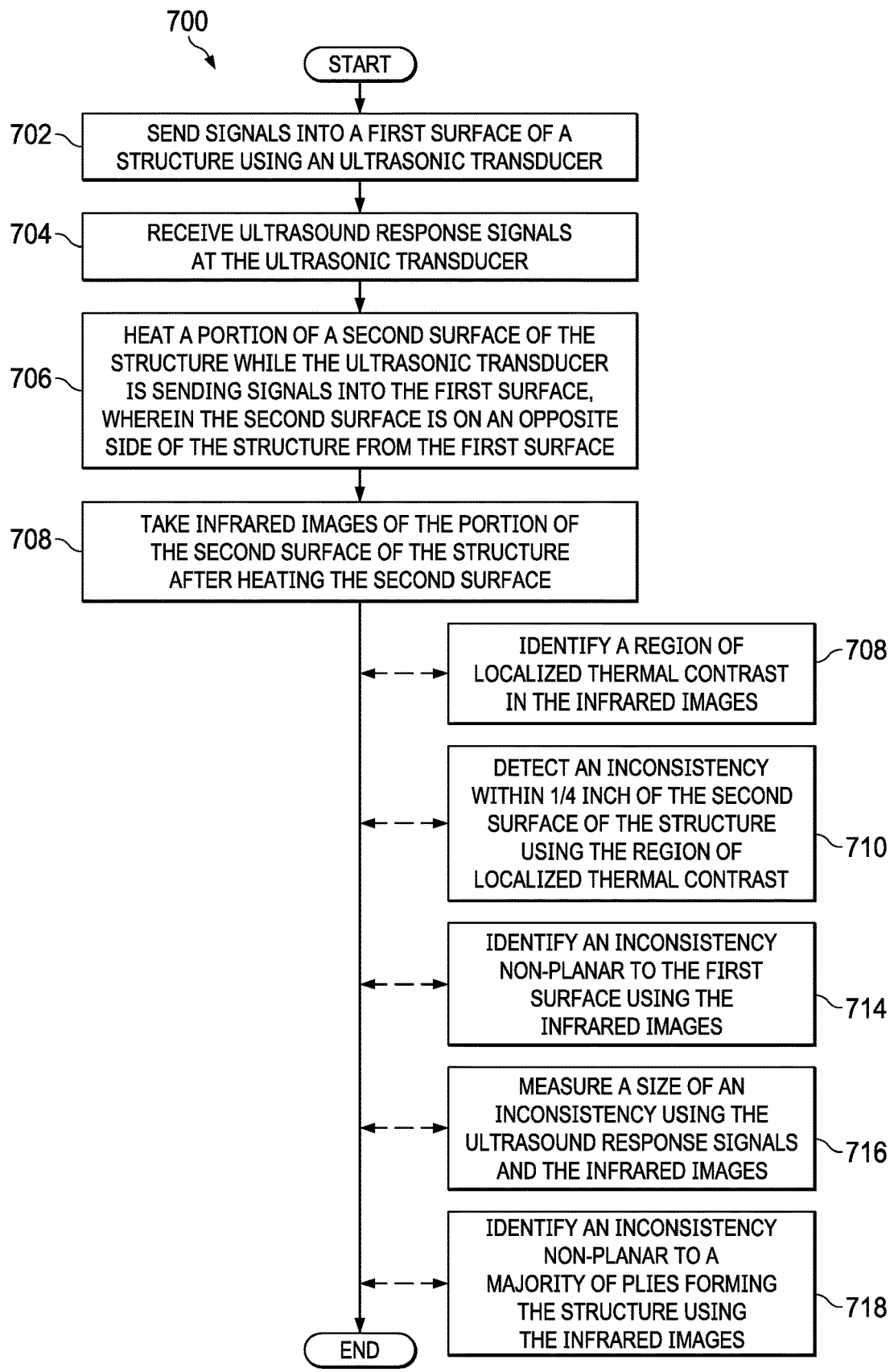
FIG. 7 is an illustration of a flowchart of a method for inspecting a composite structure in accordance with an illustrative embodiment.

Turning now to FIG. 7, an illustration of a flowchart of a method for inspecting a composite structure is depicted in accordance with an illustrative embodiment. Method 700 may be implemented in inspection environment 100 to perform ultrasonic inspection 164 and thermographic inspection 102 of FIG. 1. Method 700 may use thermography system 208 of FIG. 2 or thermography system 300 of FIG. 3. Method 700 may be performed on any of structure 406 of FIG. 4, structure 500 of FIG. 5, or structure 600 of FIG. 6.

Method 700 sends signals into a first surface of a structure using an ultrasonic transducer (operation 702). In some illustrative examples, the structure is a composite structure. Method 700 receives ultrasound response signals at the ultrasonic transducer (operation 704).

Method 700 heats a portion of a second surface of the structure while the ultrasonic transducer is sending signals into the first surface, wherein the second surface is on an opposite side of the structure from the first surface (operation 706). In some illustrative examples, at least a fraction of the portion of the second surface is not parallel to the first surface. In some illustrative examples, heating the portion of the second surface of the structure comprises heating the portion with a line heater. In some illustrative examples, heating the portion of the second surface of the structure comprises heating the portion with a heat lamp or a flash lamp.

Method 700 takes infrared images of the portion of the second surface of the structure after heating the second surface (operation 708). In some illustrative examples, taking infrared images of the portion of the second surface of the structure after heating the second surface comprises taking the infrared images using a number of infrared cameras, wherein each infrared camera is positioned at a different orientation relative to each other infrared camera.

In some illustrative examples, method 700 identifies a region of localized thermal contrast in the infrared images (operation 710). In some illustrative examples, method 700 detects an inconsistency within ¼ inch of the second surface of the structure using the region of localized thermal contrast (operation 712). In some illustrative examples, method 700 identifies an inconsistency non-planar to the first surface using the infrared images (operation 714).

In some illustrative examples, method 700 measures a size of an inconsistency using the ultrasound response signals and the infrared images (operation 716). In some illustrative examples, the inconsistency is positioned in a co-cured composite interface or a co-bonded composite interface. A portion of the inconsistency may be identified using the ultrasound response signals. A different portion of the inconsistency may be identified using the infrared images. To measure the size of the inconsistency, the two portions are combined.

In some illustrative examples, the structure is a composite material and method 700 further comprises identifying an inconsistency non-planar to a majority of plies forming the structure using the infrared images (operation 718). In some illustrative examples, the inconsistency non-planar to the majority of plies is part of an overwrap. The overwrap may contain any desirable quantity of plies.

Figure 8:
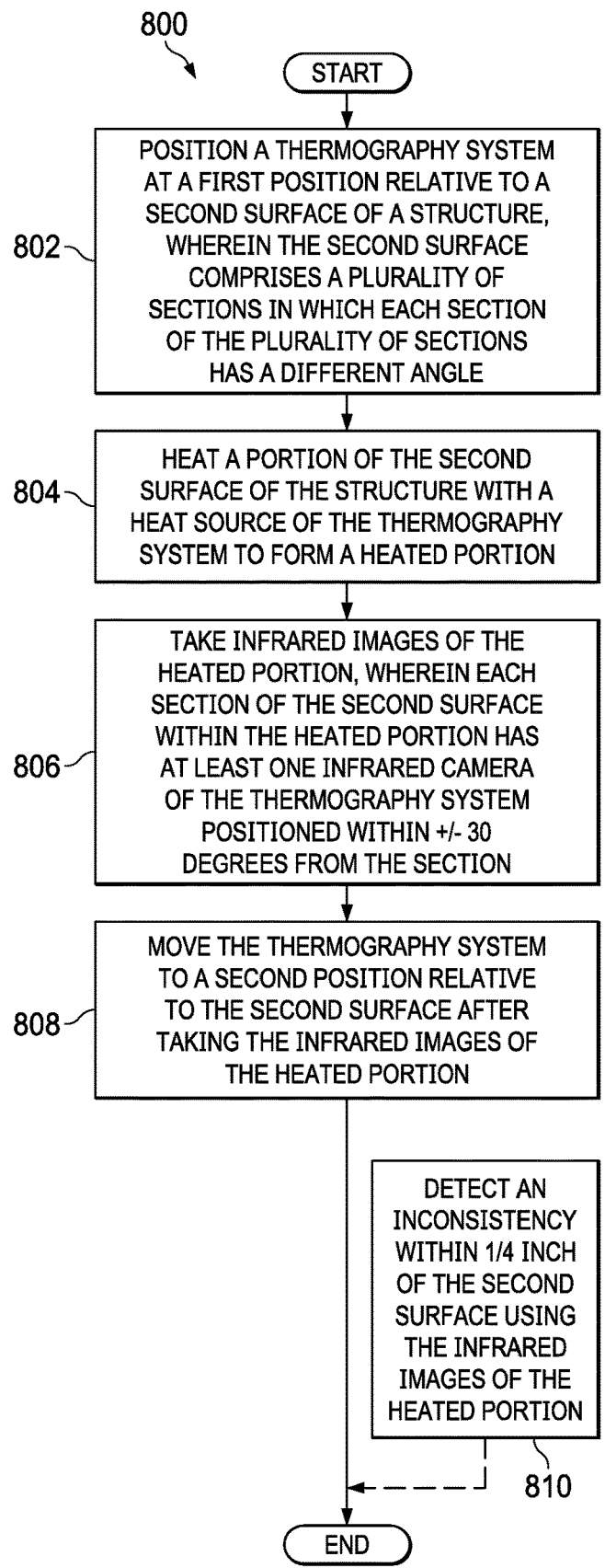
FIG. 8 is an illustration of a flowchart of a method for inspecting a composite structure in accordance with an illustrative embodiment.

Turning now to FIG. 8, an illustration of a flowchart of a method for inspecting a composite structure is depicted in accordance with an illustrative embodiment. Method 800 may be implemented in inspection environment 100 to perform ultrasonic inspection 164 and thermographic inspection 102 of FIG. 1. Method 800 may use thermography system 208 of FIG. 2 or thermography system 300 of FIG. 3. Method 800 may be performed on any of structure 406 of FIG. 4, structure 500 of FIG. 5, or structure 600 of FIG. 6.

Method 800 positions a thermography system at a first position relative to a second surface of a structure, wherein the second surface comprises a plurality of sections in which each section of the plurality of sections has a different angle (operation 802). Method 800 heats a portion of the second surface of the structure with a heat source of the thermography system to form a heated portion (operation 804).

Method 800 takes infrared images of the heated portion, wherein each section of the second surface within the heated portion has at least one infrared camera of the thermography system positioned within +/−30 degrees from the section (operation 806). In some illustrative examples, the thermography system comprises a number of infrared cameras, wherein each infrared camera of the thermography system is positioned at a different orientation relative to each other infrared camera of the thermography system. Method 800 moves the thermography system to a second position relative to the second surface after taking the infrared images of the heated portion (operation 808).

In some illustrative examples, method 800 also detects an inconsistency within ¼ inch of the second surface using the infrared images of the heated portion (operation 810). Operation 810 is an optional step. In some illustrative examples, no inconsistencies are present within ¼ inch of the second surface. In these illustrative examples, no inconsistencies will be detected. Afterwards, the method terminates.

Figure 9:
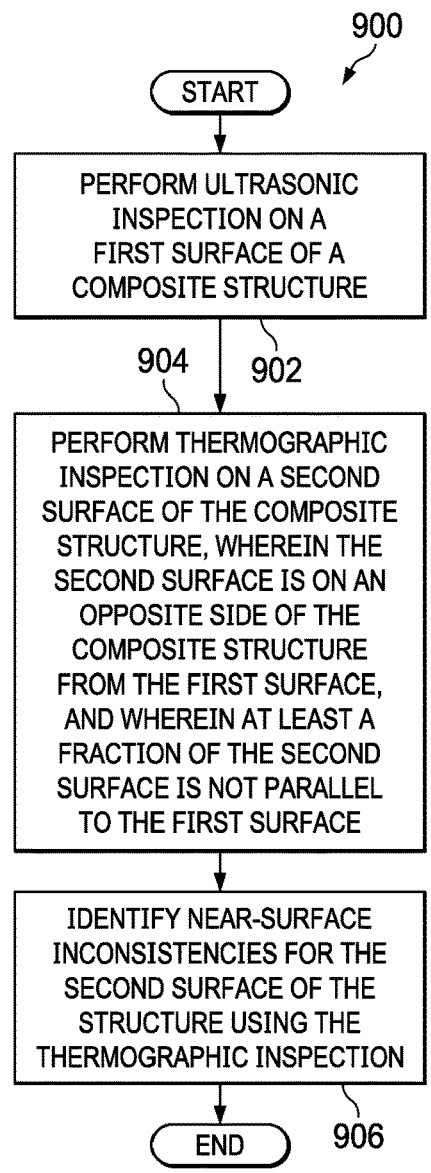
FIG. 9 is an illustration of a flowchart of a method for inspecting a composite structure in accordance with an illustrative embodiment.

Turning now to FIG. 9, an illustration of a flowchart of a method for inspecting a composite structure is depicted in accordance with an illustrative embodiment. Method 900 may be implemented in inspection environment 100 to perform ultrasonic inspection 164 and thermographic inspection 102 of FIG. 1. Method 900 may use thermography system 208 of FIG. 2 or thermography system 300 of FIG. 3. Method 900 may be performed on any of structure 406 of FIG. 4, structure 500 of FIG. 5, or structure 600 of FIG. 6.

Method 900 performs ultrasonic inspection on a first surface of a composite structure (operation 902). Method 900 performs thermographic inspection on a second surface of the composite structure, wherein the second surface is on an opposite side of the composite structure from the first surface, and wherein at least a fraction of the second surface is not parallel to the first surface (operation 904). In some illustrative examples, the second surface of the composite structure is rough. Method 900 identifies near-surface inconsistencies for the second surface of the structure using the thermographic inspection (operation 906). In some illustrative examples, at least one of the near-surface inconsistencies is non-parallel to the first surface of the composite structure. Afterwards, the method terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

For example, the heat lamp and an infrared camera are connected to an end effector, and method 700 moves the end effector relative to the structure after taking the infrared images of the portion of the second surface of the structure. In some illustrative examples, the second surface is trapezoidal. In some of these illustrative examples, method 700 further comprises detecting an inconsistency in a non-parallel leg of the second surface.

In some illustrative examples, not all blocks of in a flowchart or block diagram are performed. For example, not all blocks of method 700 may be performed. Operations 710 through 718 are optional and may or may not be performed depending upon the type of structure, shape of the structure, and presence of inconsistencies.

The illustrative examples provide methods for detecting and characterizing inconsistencies that are non-planar to a bulk of a composite structure. For example, new composite designs can consist of an overwrap that covers the initial surface of the structure. The overwrap can aid in structural performance. However, inconsistencies, such as foreign material, can occur underneath or within the overwrap. At least one of the depth or the angle of the inconsistencies underneath the overwrap relative to the remaining structure may cause ultrasonic inspection to be undesirably difficult. Thermography for an overwrapped structure can typically provide improved and more rapid inspection capability than ultrasound.

The illustrative examples provide methods for detecting near-surface inconsistencies through a rough surface of a composite structure. Thermography is equally feasible for both non-tooled and tooled surfaces.

Ultrasound is sensitive to exact geometry and surface condition, so non-tooled surfaces are very difficult for ultrasound. Thermography is not sensitive to exact geometry or surface conditions.

By using thermography for non-tooled, angled, or rough surfaces, all surfaces of a composite structure may receive inspection. In some illustrative examples, ultrasonic inspection is performed on a first surface while thermographic inspection is performed on a second surface. In some illustrative examples, ultrasonic inspection and thermographic inspection are performed simultaneously.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    sending signals into a first surface of a structure using an ultrasonic transducer;
    receiving ultrasound response signals at the ultrasonic transducer;
    heating a portion of a second surface of the structure while the ultrasonic transducer is sending signals into the first surface, wherein the second surface is on an opposite side of the structure from the first surface; and
    taking infrared images of the portion of the second surface of the structure after heating the second surface.

2. The method of claim 1 further comprising:
    identifying a region of localized thermal contrast in the infrared images; and
    detecting an inconsistency within ¼ inch of the second surface of the structure using the region of localized thermal contrast.

3. The method of claim 1, wherein the second surface is trapezoidal, the method further comprising:
    detecting an inconsistency in a non-parallel leg of the second surface.

4. The method of claim 1, wherein heating the portion of the second surface of the structure comprises heating the portion with a line heater.

5. The method of claim 1, wherein heating the portion of the second surface of the structure comprises heating the portion with a heat lamp or a flash lamp.

6. The method of claim 5, wherein the heat lamp or flash lamp and an infrared camera are connected to an end effector, the method further comprising:
    moving the end effector relative to the structure after taking the infrared images of the portion of the second surface of the structure.

7. The method of claim 1, wherein the structure is a composite structure.

8. The method of claim 1, wherein taking infrared images of the portion of the second surface of the structure after heating the second surface comprises taking the infrared images using a number of infrared cameras, each infrared camera positioned at a different orientation relative to each other infrared camera.

9. The method of claim 1 further comprising:
    measuring a size of an inconsistency using the ultrasound response signals and the infrared images.

10. The method of claim 9, wherein the inconsistency is positioned in a co-cured composite interface or a co-bonded composite interface.

11. The method of claim 1, wherein at least a fraction of the portion of the second surface is not parallel to the first surface.

12. The method of claim 1, wherein the structure is a composite material, the method further comprising:
    identifying an inconsistency non-planar to a majority of plies forming the structure using the infrared images.

13. The method of claim 1 further comprising:
    identifying an inconsistency non-planar to the first surface using the infrared images.

14. A method comprising:
    positioning a thermography system at a first position relative to a second surface of a structure, wherein the second surface comprises a plurality of sections in which each section of the plurality of sections has a different angle;
    heating a portion of the second surface of the structure with a heat source of the thermography system to form a heated portion;
    taking infrared images of the heated portion, wherein each section of the second surface within the heated portion has at least one infrared camera of the thermography system positioned within +/−30 degrees from an axis normal to the surface of the section; and moving the thermography system to a second position relative to the second surface after taking the infrared images of the heated portion.

15. The method of claim 14, wherein the thermography system comprises a number of infrared cameras, wherein each infrared camera of the thermography system is positioned at a different orientation relative to each other infrared camera of the thermography system.

16. The method of claim 14 further comprising:
detecting an inconsistency within ¼ inch of the second surface using the infrared images of the heated portion.

17. A method comprising:
performing ultrasonic inspection on a first surface of a composite structure;
performing thermographic inspection on a second surface of the composite structure, wherein the second surface is on an opposite side of the composite structure from the first surface, and wherein at least a fraction of the second surface is not parallel to the first surface; and
identifying near-surface inconsistencies for the second surface of the composite structure using the thermographic inspection.

18. The method of claim 17, wherein the second surface of the composite structure is non-tooled.

19. The method of claim 17, wherein at least one of the near-surface inconsistencies is non-parallel to the first surface of the composite structure.

* * * * *